US008743935B2

(12) United States Patent
Ikuta

(10) Patent No.: US 8,743,935 B2
(45) Date of Patent: Jun. 3, 2014

(54) WIRELESS COMMUNICATION SYSTEM, WIRELESS COMMUNICATION APPARATUS AND WIRELESS COMMUNICATION METHOD

(75) Inventor: Koji Ikuta, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 13/511,490

(22) PCT Filed: Nov. 25, 2010

(86) PCT No.: PCT/JP2010/070996
§ 371 (c)(1),
(2), (4) Date: May 23, 2012

(87) PCT Pub. No.: WO2011/065409
PCT Pub. Date: Jun. 3, 2011

(65) Prior Publication Data
US 2012/0236918 A1 Sep. 20, 2012

(30) Foreign Application Priority Data

Nov. 27, 2009 (JP) ................................ 2009-269961

(51) Int. Cl.
*H04B 17/00* (2006.01)
(52) U.S. Cl.
USPC ........... 375/224; 375/219; 375/220; 375/221; 375/222; 375/225; 375/228; 375/316; 375/295
(58) Field of Classification Search
USPC ......... 375/224, 219, 220, 221, 222, 225, 228, 375/316, 295
See application file for complete search history.

(56) References Cited

U.S. PATENT DOCUMENTS

| 6,549,759 | B2 * | 4/2003 | Arviv et al. ..................... 455/69 |
| 6,941,113 | B2 | 9/2005 | Asano |
| 7,310,531 | B2 | 12/2007 | Uchida |
| 7,321,614 | B2 * | 1/2008 | Jacobsen et al. .............. 375/221 |
| 8,086,259 | B2 | 12/2011 | Sasaki et al. |
| 8,150,329 | B2 | 4/2012 | Kawai |
| 8,432,818 | B2 * | 4/2013 | Cai et al. ....................... 370/252 |

(Continued)

FOREIGN PATENT DOCUMENTS

| JP | 9-135275 A | 5/1997 |
| JP | 2002-290246 A | 10/2002 |
| JP | 2004-350107 A | 12/2004 |
| JP | 2005-094605 | 4/2005 |

(Continued)

OTHER PUBLICATIONS

Japanese Office Action, Aug. 6, 2013, 4 pages.

Primary Examiner — Siu Lee
(74) Attorney, Agent, or Firm — Foley & Lardner LLP

(57) ABSTRACT

In a wireless communication system performing wireless communication via a wireless transmission path, a first wireless communication apparatus includes a receiver that receives a wireless signal via a wireless transmission path, a disconnection detector that detects disconnection of a wireless line connected to a second communication apparatus, a modulation controller that selects a modulation scheme, enabling communication under poor conditions in a transmission path, rather than a modulation scheme which has been used in wireless communication, and a transmitter that notifies the modulation scheme selected by the modulation scheme controller to the second wireless communication apparatus. The second wireless communication apparatus includes a receiver that receives the selected modulation scheme from the first wireless communication apparatus, and a transmitter that transmits signals to the first wireless communication apparatus based on the selected modulation scheme which is received by the receiver.

16 Claims, 7 Drawing Sheets

(56) References Cited

U.S. PATENT DOCUMENTS

2009/0274199 A1* 11/2009 Onodera et al. .............. 375/219
2009/0300453 A1* 12/2009 Sahara ........................ 714/748
2009/0305735 A1* 12/2009 Sasaki et al. ................. 455/522

FOREIGN PATENT DOCUMENTS

| JP | 2009-124738 A | 6/2009 |
| WO | WO 2007/138796 A1 | 12/2007 |
| WO | WO 2007/148784 A1 | 12/2007 |

* cited by examiner

WIRELESS COMMUNICATION SYSTEM, WIRELESS COMMUNICATION APPARATUS AND WIRELESS COMMUNICATION METHOD

TECHNICAL FIELD

The present invention relates to a technology for controlling a modulation scheme in wireless communication.

BACKGROUND ART

As a technology keeping up with changing conditions of wireless lines, an adaptive modulation method has been conventionally proposed. The adaptive modulation method discriminates conditions of wireless lines so as to perform communication according to a modulation scheme with a low multi-value modulation number when conditions are poor or to perform communication according to a modulation scheme with a high multi-value modulation number when conditions are good. Specifically, a receiver estimates a condition of a wireless line based on a received signal so as to determine its modulation scheme, thus feeding back the determined modulation scheme to a transmitter. The transmitter adopts the modulation scheme, which is fed back from the receiver, so as to carry out its transmitting process. This adaptive modulation method has been widely adopted in fixed microwave radio transmission devices and radio base stations for use in mobile communications.

As a determination method of a modulation scheme in an adaptive modulation method, technologies with high and precise traceability with changing conditions of wireless lines, such as technologies disclosed in PLT 1 and PLT 2, have been conventionally proposed.

CITATION LIST

Patent Literature

PLT 1: Japanese Patent Publication No. 2009-124738
PLT 2: Japanese Patent Publication No. 2005-94605

SUMMARY OF INVENTION

Technical Problem

However, conventional technologies failed to sufficiently study how to control modulation schemes when wireless lines become disconnected. For this reason, they give rise to the following problems.

When wireless lines are rapidly degraded during wireless transmission according to a modulation scheme with a high multi-value modulation number, wireless lines will be disconnected before an adaptive modulation method switches its modulation scheme to a modulation scheme with a low multi-value modulation number. Generally speaking, a modulation scheme with a high multi-value modulation number needs a high reception level in establishing connection with wireless lines, whereby a high reception level is needed to restore wireless lines which are disconnected as described above; hence, this causes a problem that a long period of time is necessary to restore wireless lines.

Considering the foregoing circumstances, the present invention aims to provide a technology which is able to restore wireless lines in a short period of time when wireless lines are disconnected during wireless communication according to an adaptive modulation method.

Solution to Problem

One aspect of the present invention refers to a wireless communication system including a first wireless communication apparatus and a second wireless communication apparatus which perform wireless communication via a wireless line. The first wireless communication apparatus includes a receiver that receives a wireless signal from the second wireless communication apparatus via a wireless line; a disconnection detector that detects disconnection of a wireless line connected to the second wireless communication apparatus; a modulation scheme controller that selects a modulation scheme, enabling communication under poor conditions in a wireless line, rather than a modulation scheme which has been selected in wireless communication when the disconnection of a wireless line is detected; and a transmitter that notifies the selected modulation scheme to the second wireless communication apparatus. The second wireless communication apparatus includes a receiver that receives the notification indicating the selected modulation scheme from the first wireless communication apparatus; and a transmitter that transmits signals to the first wireless communication apparatus based on the selected modulation scheme which is received by the receiver.

According to one aspect of the present invention, a wireless communication apparatus includes a receiver that receives a wireless signal from another wireless communication apparatus via a wireless line; a disconnection detector that detects disconnection of a wireless line connected to another wireless communication apparatus; a modulation scheme controller that selects a modulation scheme, enabling communication under poor conditions in a wireless line, rather than a modulation scheme which has been used in wireless communication when the disconnection of a wireless line is detected; and a transmitter that notifies a modulation scheme selected by the modulation scheme controller to another wireless communication apparatus, which thus adopt it in generating a transmitting signal to a current apparatus.

One aspect of the present invention refers to a wireless communication method implemented by a wireless communication system including a first wireless communication apparatus and a second wireless communication apparatus which perform wireless communication via a wireless line. It includes the steps in which: the first wireless communication apparatus receives a wireless signal from the second wireless communication apparatus via a wireless line; the first wireless communication apparatus detects disconnection of a wireless line connected to the second wireless communication apparatus; the first wireless communication apparatus selects a modulation scheme, enabling communication under poor conditions in a wireless line, rather than a modulation scheme which has been selected in wireless communication when the disconnection of a wireless line is detected; the first wireless communication apparatus notifies the selected modulation scheme to the second wireless communication apparatus; the second wireless communication apparatus receives the selected modulation scheme from the first wireless communication apparatus; and the second wireless communication apparatus transmits signals to the first wireless communication apparatus based on the selected modulation scheme which is received.

Advantageous Effects of Invention

The present invention is able to restore wireless lines in a short period of time when wireless lines are disconnected during wireless communication according to an adaptive modulation method.

DESCRIPTION OF EMBODIMENTS

Figure 1:
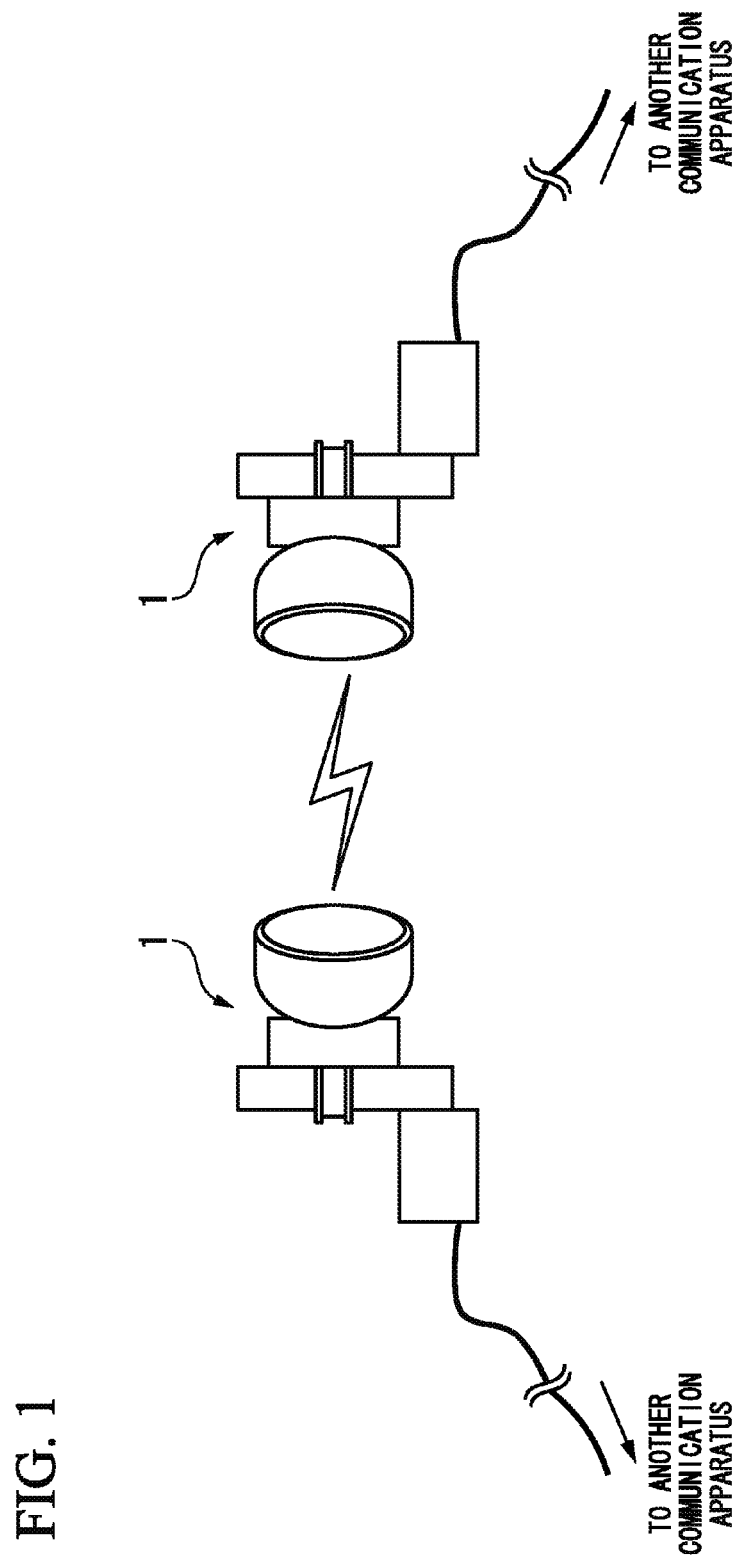
FIG. 1 A schematic diagram showing a general system configuration of a wireless communication system.

FIG. 1 is a system configuration diagram showing the system configuration of a wireless communication system. The wireless communication system includes a plurality of wireless communication apparatuses 1. In the wireless communication system of FIG. 1, wireless communication apparatuses wirelessly communicate with each other based on an adaptive modulation method. The wireless communication system shown in FIG. 1 exhibits one example of its configuration; hence, one wireless communication apparatus 1 may be configured using a mobile phone or a wireless LAN terminal device while the other wireless communication apparatus 1 may be configured using a mobile-phone base station or a wireless-LAN base station.

Figure 2:
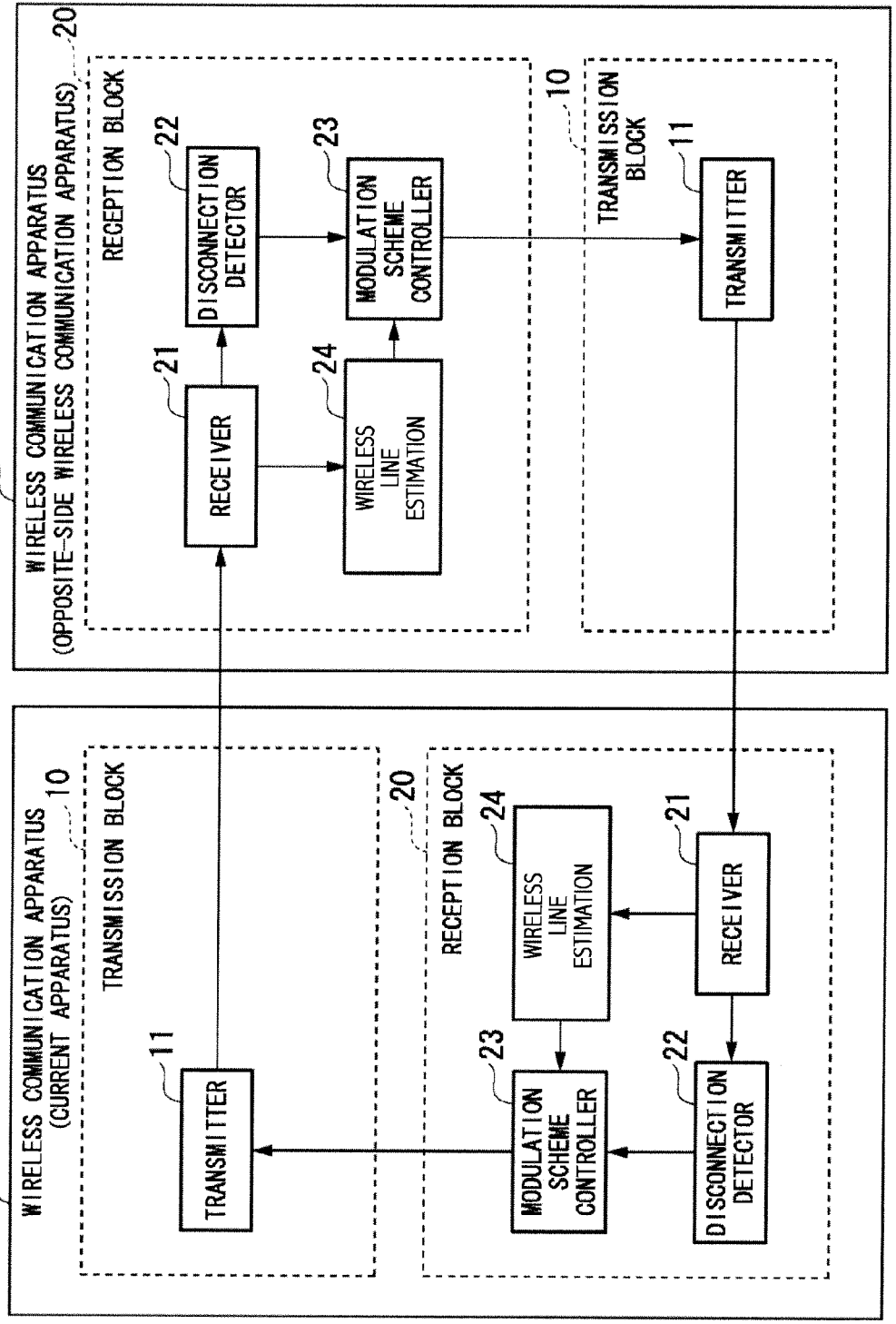
FIG. 2 A block diagram showing a functional configuration of a wireless communication system according to embodiments of the present invention.

FIG. 2 is a block diagram showing the outline of a functional configuration of a wireless communication system. This wireless communication system includes a wireless communication apparatus 1 and another wireless communication apparatus 1 which serves as a correspondent to the wireless communication apparatus 1. The following description refers to the former wireless communication apparatus 1 as a "current apparatus 1-1" and the other wireless communication apparatus 1, serving as a correspondent to the current apparatus 1-1, as an "opposite-side wireless communication apparatus 1-2".

The wireless communication apparatus 1 (i.e. the current apparatus 1-1 and the opposite-side wireless communication apparatus 1-2) includes a transmission block 10 and a reception block 20. The transmission block 10 includes a transmitter 11. The reception block 20 includes a receiver 21, a disconnection detector 22, a modulation scheme controller 23, and a wireless line estimation part 24. The receiver 21 of the current apparatus 1-1 receives a wireless signal from the opposite-side wireless communication apparatus 1-2 via a wireless line. The disconnection detector 22 of the current apparatus 1-1 detects disconnection of a wireless line connected to the opposite-side wireless communication apparatus 1-2. Upon detecting disconnection of a wireless line connected to the opposite-side wireless communication apparatus 1-2, the modulation scheme controller 23 of the current apparatus 1-1 selects a modulation scheme which is able to carry out communication under poor conditions in a wireless line rather than that of a modulation scheme which has been used in wireless communication. The wireless line estimation part 24 of the current apparatus 1-1 estimates a condition of a wireless line based on a wireless signal received by the receiver 21 of the current apparatus 1-1. The transmitter 11 of the current apparatus 1-1 notifies the opposite-side wireless communication apparatus 1-2 of the modulation scheme selected by the modulation scheme controller 23.

The receiver 21 of the opposite-side wireless communication apparatus 1-2 receives a notification regarding the modulation scheme from the transmitter 11 of the current apparatus 1-1. The transmitter 11 of the opposite-side wireless communication apparatus 1-2 transmits signals to the current apparatus 1-1 based on the modulation method received by the receiver 21 of the opposite-side wireless communication apparatus 1-2. This is the outline of the configuration of a wireless communication system. Next, the configuration of the wireless communication apparatus 1 will be described in detail with respect to first to third embodiments.

First Embodiment

Figure 3:
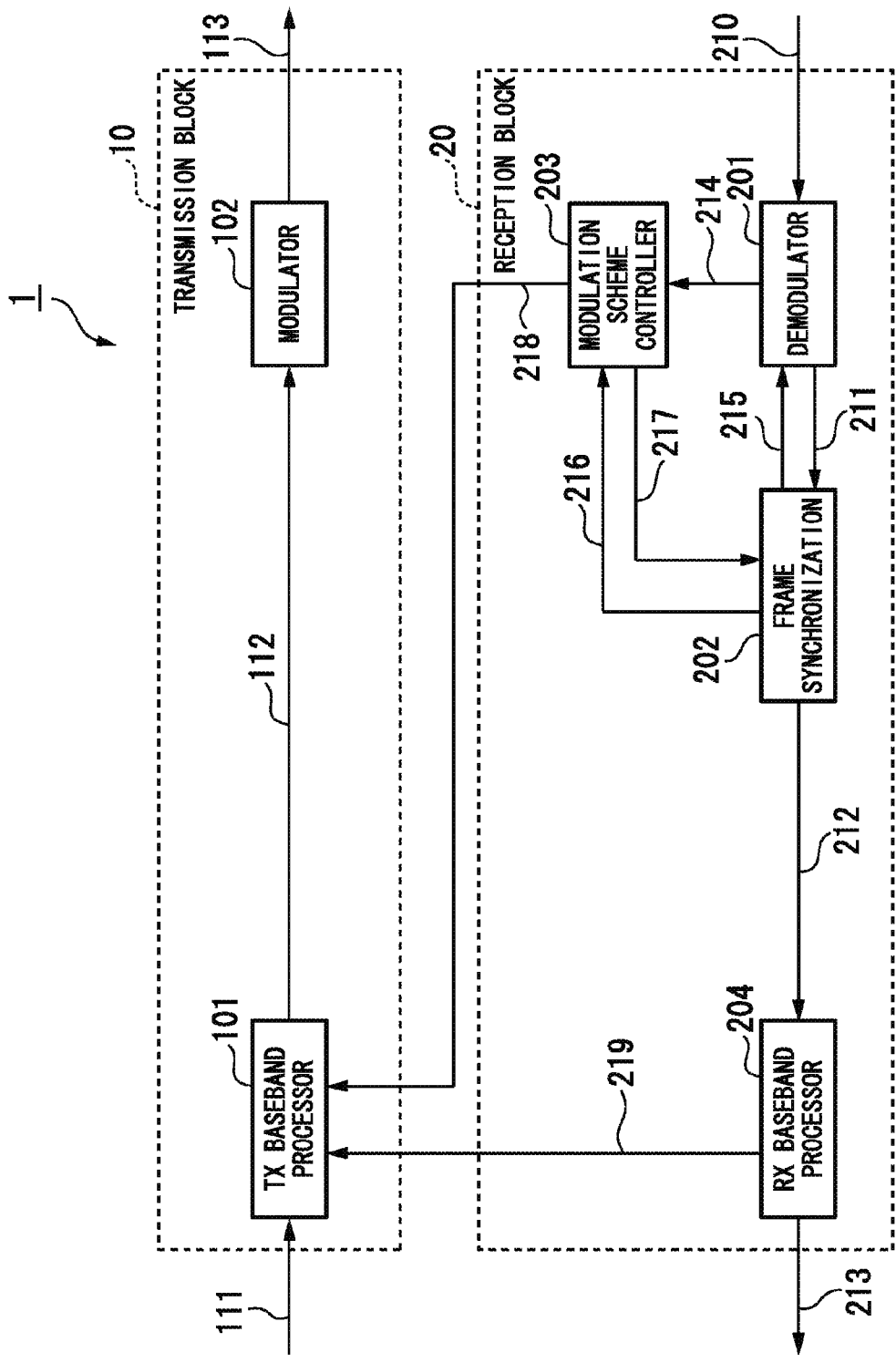
FIG. 3 A block diagram showing a functional configuration of a wireless communication apparatus according to a first embodiment of the present invention.
Figure 4:
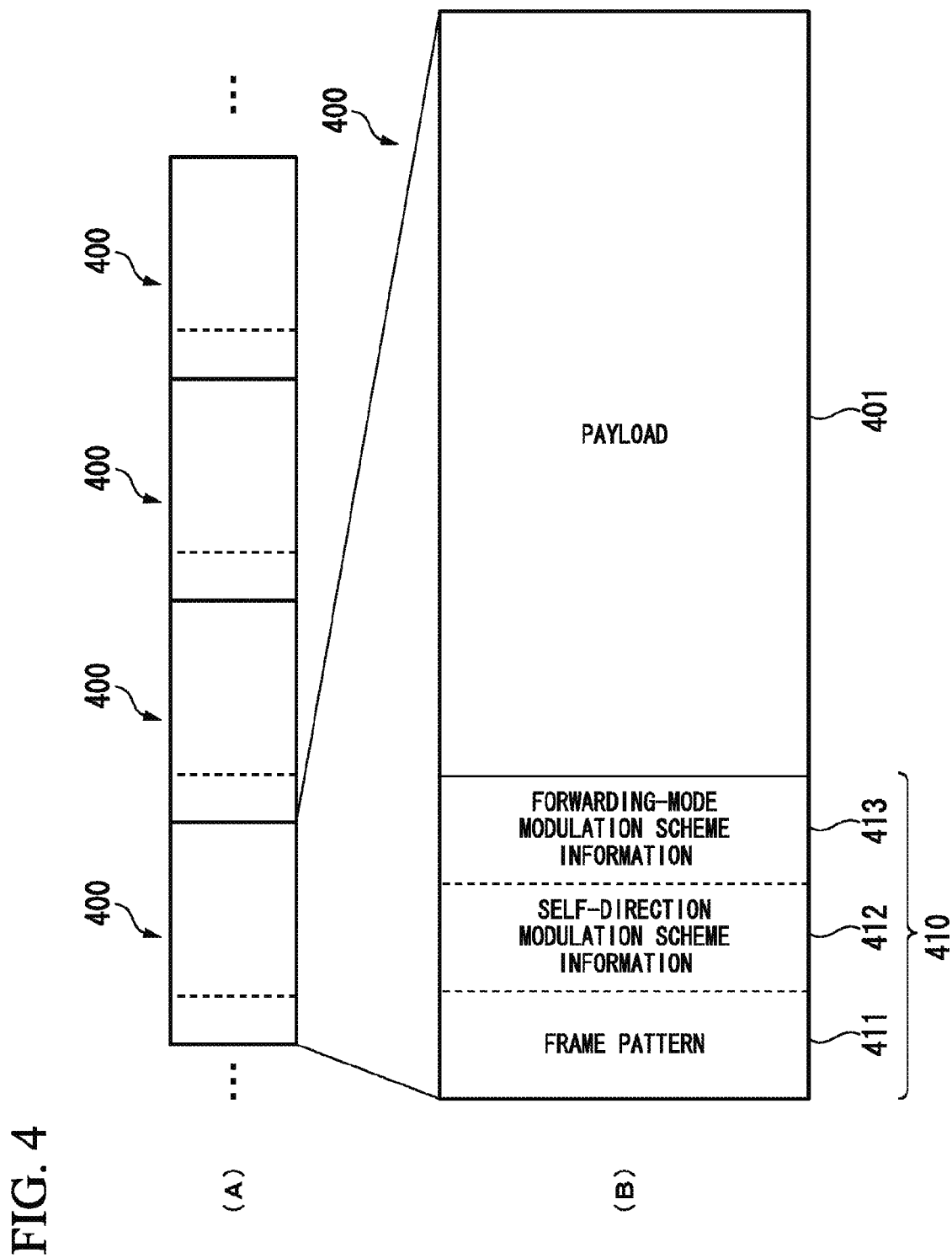
FIG. 4 Illustrations showing the outline of a wireless frame format and a signal used in the wireless communication apparatus shown in FIG. 3.

Next, the wireless communication apparatus 1 (i.e. the current apparatus 1-1) according to a first embodiment will be described with reference to FIGS. 3 and 4. FIG. 3 is a diagrammatical block diagram showing the functional configuration of the wireless communication apparatus 1 of the first embodiment. FIG. 4 illustrates the outline of a wireless frame format and a signal used in the wireless communication apparatus 1. The details of FIG. 4 will be described later.

The wireless communication apparatus 1 of the first embodiment includes a transmission block 10 and a reception block 20. The transmission block 10 includes a TX baseband processor 101 and a modulator 102. The reception block 20 includes a demodulator 201, a frame synchronization part 202, a modulation scheme controller 203, and an RX baseband processor 204. The TX baseband processor 101 and the modulator 102 correspond to the transmitter 11. The demodulator 201 corresponds to the receiver 21 and the wireless transmission path estimation part 24. The frame synchronization part 202 corresponds to the disconnection detector 22. The modulation scheme controller 203 corresponds to the modulation scheme controller 23. Next, the wireless communication apparatus 1 of the first embodiment will be further described in detail.

The TX baseband processor 101 is connected to a wire-communication network such as Ethernet (a trademark)/PDH/SDH, so that it receives a TX baseband input signal 111 from another communication apparatus in the wire-communication network. The TX baseband processor 101 multiplexes the received TX baseband input signal 111 with a payload 401 in a wireless frame format. The TX baseband processor 101 multiplexes a transmitting modulation scheme information signal 219 with self-direction modulation scheme information 412 in an overhead 410 while multiplexing an opposite forwarding-mode modulation scheme information signal 218 with forwarding-mode modulation scheme information 413 from the overhead 410.

The transmitting modulation scheme information signal 219 is a signal representing a modulation scheme which is determined by the modulation scheme controller 203 of the opposite-side wireless communication apparatus 1-2.

The opposite forwarding-mode modulation scheme information signal 218 is a signal representing a modulation scheme which is determined by the modulation scheme controller 203 of the current apparatus 1-1, i.e. a signal representing a modulation scheme which should be applied to the modulator 102 of the opposite-side wireless communication apparatus 1-2. The opposite forwarding-mode modulation scheme information signal 218 is multiplexed with a TX baseband output signal 112 and notified to the opposite-side wireless communication apparatus 1-2. The opposite forwarding-mode modulation scheme information signal 218 is extracted by the RX baseband processor 204 of the opposite-side wireless communication apparatus 1-2 and transmitted to the transmission block 10 as a transmitting modulation scheme information signal 219, which is thus used for a modulating process in wireless communication from the opposite-side wireless communication apparatus 1-2 to the current apparatus 1-1.

Additionally, the TX baseband processor 101 performs a scramble process and an error-correcting coding process on the payload 401, thus generating a TX baseband output signal 112. Next, the TX baseband processor 101 sends the generated TX baseband output signal 112 to the modulator 102.

The modulator 102 performs a modulating process on the TX baseband output signal 112 from the TX baseband processor 101, thus generating a transmitting modulation signal 113. At this time, the modulator 102 extracts the transmitting modulation scheme information signal 219 from the self-direction modulation scheme information 412 of the received TX baseband output signal 112, thus performing a modulating process based on the modulation scheme specified by the extracted transmitting modulation scheme information signal 219. Specifically, the modulator 102 performs a mapping process, waveform shaping, nonlinear distortion correction, and modulation to an intermediate frequency in response to the specified modulation scheme. Next, the modulator 102 performs power amplification and frequency conversion to a high frequency range on the generated transmitting modulation signal 113, which is subsequently sent onto a wireless line via an antenna.

A wireless frame 400 is set to a minimum unit as an interval applying a modulation scheme. For this reason, the modulator 102 needs to wait for a next wireless frame 400 in order to apply the modulation scheme specified by the transmitting modulation scheme information signal 219 which is extracted from the self-direction modulation scheme information 412. When a previous wireless frame 400 and a current wireless frame 400 employ modulation schemes indicating QPSK and 256QAM, for example, the modulator 102 performs a modulating process based on QPSK in the current wireless frame 400 but a modulating process based on 256 QAM in the next wireless frame 400. In this connection, it is possible to appropriately determine the number of wireless frames 400, each serving as an interval determining and applying a modulation scheme, in light of the applied environment of the wireless communication apparatus 1.

With respect to a received modulation signal 210 which is transmitted from the opposite-side wireless communication apparatus 1-2 via a wireless line and received via an antenna, the demodulator 201 performs power amplification and frequency conversion to an intermediate frequency range and subsequently performs a demodulating process into a baseband range. At this time, the demodulator 201 performs a demodulating process based on a modulation scheme specified by a demodulation-mode modulation scheme information signal 215 received by the frame synchronization part 202. Specifically, the demodulator 201 performs waveform shaping, waveform-processing, carrier synchronization establishment, and a demapping process in response to the foregoing modulation scheme. Thereafter, the demodulator 201 sends a demodulator output signal 211, which is generated according to a demodulating process, to the frame synchronization part 202.

The demodulator 201 determines a reception quality based on the received modulation signal 210, thus generating a reception quality determinant signal 214. The reception quality determinant signal 214 is information representing an estimation result regarding a condition of a wireless line which is determined by the demodulator 201 based on a carrier to noise ratio (CNR) and a reception level. Next, the demodulator 201 sends the generated reception quality determinant signal 214 to the modulation scheme controller 203.

The frame synchronization part 202 establishes frame synchronization on the demodulator output signal 211 from the demodulator 201, thus generating a frame synchronization circuit output signal 212. The frame synchronization part 202 sends the generated frame synchronization circuit output signal 212 to the RX baseband processor 204. Specifically, the frame synchronization part 202 extracts the frame pattern 411 of the overhead 410 in the demodulator output signal 211 from the demodulator 201. The frame synchronization part 202 compares the extracted frame pattern with an already-known frame pattern, wherein it determines that frame synchronism is established when pattern matching is detected a predetermined number of times in a row. On the other hand, when pattern matching is not detected a predetermined number of times in a row, the frame synchronization part 202 determines that there is frame asynchronism. Upon determining frame asynchronism, the frame synchronization part 202 overwrites the demodulation-mode modulation scheme information signal 215 with modulation scheme information specified by a wireless disconnection-mode modulation scheme information signal 217. It is possible to appropriately set a determination method for determining establishment of frame synchronism or frame asynchronism, and the number of times for comparing frame patterns in light of the applied environment of the wireless communication apparatus 1.

After establishing frame synchronism, the frame synchronization part 202 detects a position of the self-direction modulation scheme information 412 with reference to a top position of the wireless frame 400. Next, the frame synchronization part 202 extracts modulation scheme information from the detected self-direction modulation scheme information 412 so as to send it to the modulator 201 as the demodulation-mode modulation scheme information signal 215.

In the reception block 20, the frame synchronization part 202 may firstly detect a position of the wireless frame 400. Therefore, the demodulator 201 is unable to acknowledge a top position of the wireless frame 400 and thus unable to adjust the timing for applying a modulation scheme which the frame synchronization part 202 notifies using the demodulation-mode modulation scheme information signal 215. For this reason, the frame synchronization part 202 sends modulation scheme information, which is extracted from the self-direction modulation scheme information 412, at the timing equivalent to the timing of the next wireless frame 400 subtracting a processing delay of the frame synchronization part 202. Using this process, the modulator 201 is able to perform its demodulating process on each wireless frame 400 according to an appropriate modulation scheme.

Based on the reception quality determinant signal 214 and a frame asynchronism starting signal 216, the modulation scheme controller 203 determines a modulation scheme which should be applied to the modulator 102 of the opposite-side wireless communication apparatus 1-2. Thereafter, the modulation scheme controller 203 generates an opposite forwarding-mode modulation scheme information signal 218 representing its determination result, which is subsequently sent to the TX baseband processor 101.

Additionally, the modulation scheme controller 203 receives the frame asynchronism starting signal 216 from the frame synchronization part 202. Upon determining disconnection of a wireless line connected with the opposite-side wireless communication apparatus 1-2, the modulation scheme controller 203 sends the wireless disconnection-mode modulation scheme information signal 217, representing a modulation scheme which should be adopted due to occurrence of disconnection of a wireless line becomes disconnected, to the frame synchronization part 202.

The RX baseband processor 204 performs an error-correcting decoding process and a descramble process on the payload 401 of the frame synchronization output signal 212 from the frame synchronization part 202, thus generating an RX baseband output signal 213. The RX baseband processor 204 sends the generated RX baseband output signal 213 to another communication apparatus in a wire-communication network connected thereto such as Ethernet (a trademark)/PDH/SDH.

The RX baseband processor 204 extracts modulation scheme information from the forwarding-mode modulation scheme information 413 within the frame synchronization output signal 212 from the frame synchronization part 202. Thereafter, the RX baseband processor 204 sends the extracted modulation scheme information to the TX baseband processor 101 as a transmitting modulation scheme information signal 219. The transmitting modulation scheme information signal 219 is used for a modulating process in wireless communication from the current apparatus 1-1 to the opposite-side wireless communication apparatus 1-2, i.e. a modulating process of the modulator 102 of the current apparatus 1-1.

Next, a signal and a wireless frame format used in the wireless communication apparatus 1 will be described in detail with reference to FIG. 4. FIG. 4 shows the outline of a signal transmitted by the wireless communication apparatus 1. As shown in this figure, the wireless communication apparatus 1 transmits a signal (A) consecutively arranging a plurality of wireless frames 400. As shown in a format (B) of the wireless frame 400 transmitted by the wireless communication apparatus 1, the wireless frame 400 includes a payload 401 and an overhead 410. The overhead 410 is arranged at a top position of the wireless frame 400 and includes information that is necessary to establish frame synchronism and to control a modulation scheme. Specifically, the overhead 410 includes a frame pattern 411, self-direction modulation scheme information 412, and forwarding-mode modulation scheme information 413.

The frame pattern 411 is multiplexed with a fixed-data pattern which the frame synchronization part 202 uses to establish frame synchronism. The self-direction modulation scheme information 412 is multiplexed with modulation scheme information that is determined by the opposite-side wireless communication apparatus 1-2, i.e. modulation scheme information used for a modulating process in wireless communication in a transmitting direction of the wireless frame 400. The forwarding-mode modulation scheme information 413 is multiplexed with modulation scheme information that is determined by the modulation scheme controller 203 of the current apparatus 1-1.

The wireless communication apparatus 1 independently controls modulation schemes in bidirectional communications. For this reason, the wireless frame 400 includes not only the self-direction modulation scheme information 412 but also the forwarding-mode modulation scheme information 413. Additionally, it is possible to appropriately determine each pattern, its data lengths, and its multiplexing sequence in light of the applied environment of the wireless communication apparatus 1. The payload 401 is generally multiplexed with transmitting information. The format of the wireless frame 400 shown in FIG. 4 is a minimum unit for switching a modulation scheme. Basically, each of the TX baseband output signal 112, the demodulator output signal 211, and the frame synchronization output signal 212 includes an overhead 410 of FIG. 4 at a top position of each wireless frame 400.

Figure 5:
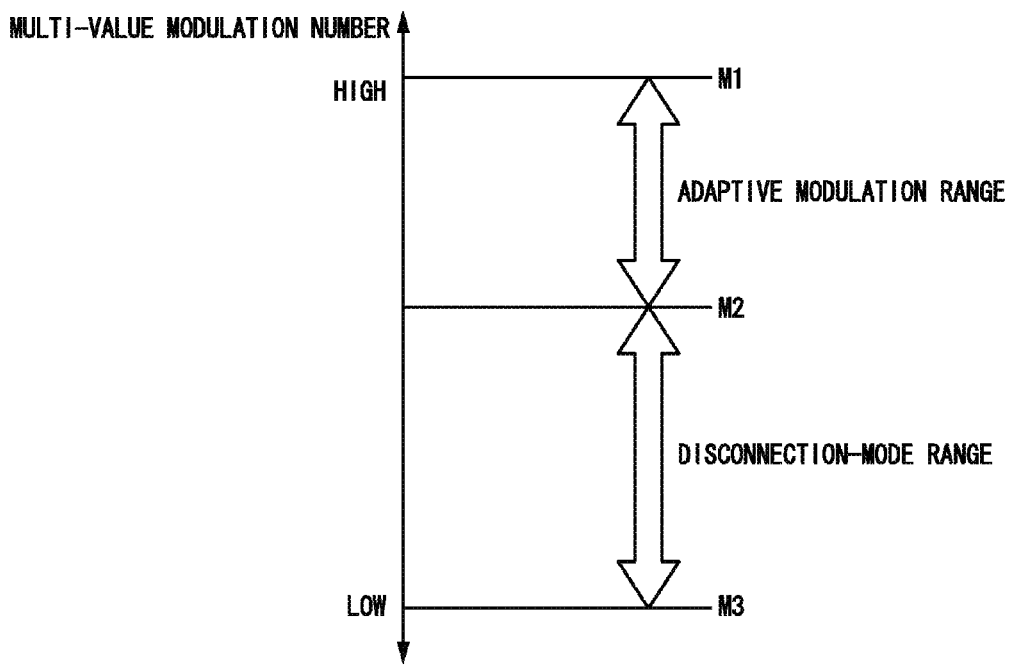
FIG. 5 An illustration showing the outline of processing how a modulation scheme controller shown in FIG. 3 determines a modulation scheme.

FIG. 5 shows diagrammatical processing of the modulation scheme controller 203 determining its modulation scheme. The modulation scheme controller 203 determines its modulation scheme by selecting a multi-value modulation number within a predetermined range. A range of multi-value modulation numbers which can be selected by the modulation scheme controller 203 consists of two ranges, i.e. an adaptive modulation range and a disconnection-mode range. In the case of FIG. 5, an adaptive modulation range is a range from a multi-value modulation number M1 to a multi-value modulation number M2, while a disconnection-mode range is a range from the multi-value modulation number M2 to a multi-value modulation number M3. In FIG. 5, both the lowest multi-value modulation number of the adaptive modulation range and the highest multi-value modulation number of the disconnection-mode range are identical to M2; but they are not necessarily identical to each other; hence, it is possible to separate the adaptive modulation range from the disconnection-mode range.

The adaptive modulation range indicates a range including multi-value modulation numbers that are greater than the highest multi-value modulation number of the disconnection-mode range, indicating a range of multi-value modulation numbers which can be normally selected according to an adaptive modulation scheme in a normally connected condition of wireless lines. On the other hand, the disconnection-mode range indicates a range of multi-value modulation numbers which can be selected in a disconnected condition of wireless lines and a restoration period after disconnection. In this connection, the disconnection-mode range may include a single multi-value modulation number. In this case, a multi-value modulation number included in the disconnection-mode range may be the smallest multi-value modulation number among numbers which can be selected by the wireless communication apparatus 1.

For instance, it is possible to set QPSK, 16QAM as the disconnection-mode range while setting 32QAM, 64QAM, 128QAM, 256QAM as the adaptive modulation range. In his connection, it is possible to appropriately determine multi-value modulation numbers of modulation schemes, applied to the adaptive modulation range and the disconnection-mode range, in light of the usage of the wireless communication apparatus 1 and the wireless transmission environment.

Figure 6:
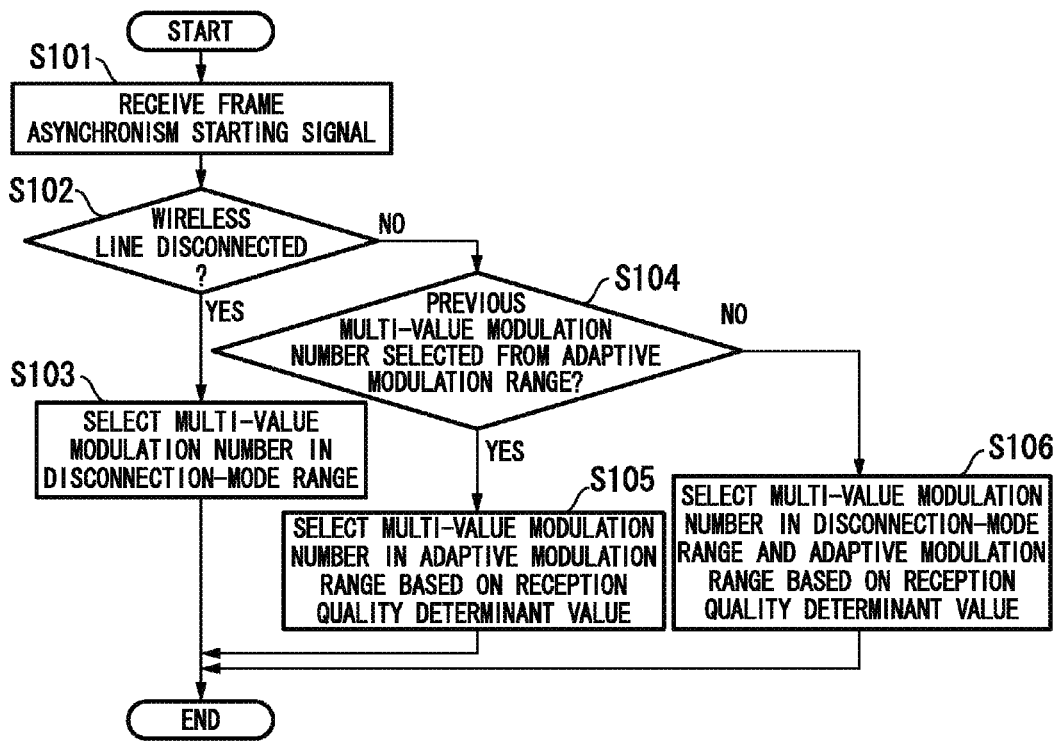
FIG. 6 A flowchart showing a flow of processing of the modulation scheme controller shown in FIG. 3.

FIG. 6 is a flowchart showing a flow of processing of the modulation scheme controller 203. The modulation scheme controller 203 receives a frame asynchronism starting signal 216 from the frame synchronization part 202 (step S101). Based on the received frame asynchronism starting signal 216, the modulation scheme controller 203 determines whether or not a wireless line connected to the opposite-side wireless communication apparatus 1-2 has been disconnected (step S102). The modulation scheme controller 203 determines whether or not a wireless line is disconnected by way of a decision as to whether or not the frame asynchronism starting signal 216 has a value indicating a frame-synchronous condition. When the frame asynchronism starting signal 216 has a value indicating a frame-synchronous condition (e.g. "Low"), the modulation scheme controller 203 determines that a wireless line is not disconnected, i.e. a normal condition. On the other hand, when the frame asynchronism starting signal 216 has a value indicating a frame-asynchronous condition (e.g. "High"), the modulation scheme controller 203 determines that a wireless line has been disconnected.

In the case of a disconnection of a wireless line (step S102—YES), the modulation scheme controller 203 selects a multi-value modulation number within the disconnection-mode range (step S103). At this time, for example, the modulation scheme controller 203 selects the lowest multi-value modulation number (M3) within the disconnection-mode range.

In contrast, when a wireless line is not disconnected (step S102—NO), the modulation scheme controller 203 makes a decision as to whether or not a multi-value modulation number, which has been selected at a previous time of selecting a modulation scheme, is selected in the adaptive modulation range (step S104). When a multi-value modulation number, which has been selected at a previous time of selecting a modulation scheme, is selected in the adaptive modulation range (step S104—YES), the modulation scheme controller 203 selects a multi-value modulation number in the adaptive modulation range based on the reception quality determinant signal 214 from the demodulator 201 (step S105). On the other hand, when a multi-value modulation number, which has been selected at a previous time of selecting a modulation scheme, is not selected in the adaptive modulation range (step S104—NO), i.e. when it is selected in the disconnection-mode range, the modulation scheme controller 203 determines a restoration period so as to select a multi-value modulation number among the adaptive modulation range and the disconnection-mode range based on the reception quality determinant signal 214 from the demodulator 201 (step S106).

The wireless communication apparatus 1 having the foregoing configuration determines existence/nonexistence of disconnection of a wireless line between the current apparatus 1 and the opposite-side wireless communication apparatus 1-2 based on the existence/nonexistence of frame asynchronism. Thus, the modulation scheme controller 203 selects a multi-value modulation number that is smaller than normal when the current apparatus 1-1 detects disconnection of a wireless line. Compared with the conventional adaptive modulation method which selects a multi-value modulation number normally within a predetermined range irrespective of normality of a wireless line, it is possible to start communication at a low communication speed despite poor conditions in a transmission path in communication; hence, it is possible to restore a wireless line in a short period of time.

Additionally, a multi-value modulation number is selected within the adaptive modulation range in consideration of normality of a wireless line. For this reason, it is possible to maintain a high communication speed by preventing unnecessarily small multi-value modulation numbers from being selected; hence, it is possible to promptly restore a good condition from a wireless line-disconnected condition as described above.

<Variations>

The foregoing description refers to the modulation scheme controller 203 which determines its modulation scheme by selecting a multi-value modulation number. The modulation scheme controller 203 can be reconfigured to determine its modulation scheme by selecting not only a multi-value modulation number but also another value. For example, it can be reconfigured to determine its modulation scheme by selecting a value of a coding ratio among a plurality of values. In this case, an adaptive modulation range and a disconnection-mode range can be set to a selecting range of coding ratios. In either case, values representing high transmission speeds may be set to the adaptive modulation range, while value representing low transmission speeds but high resistances may be set to the disconnection-mode range.

Additionally, the frame synchronization part 202 can be reconfigured to overwrite the demodulation-mode modulation scheme information signal 215 and the forwarding-mode modulation scheme information 413 of the overhead 410 with modulation scheme information specified by the wireless disconnection-mode modulation scheme information signal 217 when it determines that there is frame asynchronism. In this case, even when bidirectional wireless lines between the current apparatus 1 and the opposite-side wireless communication apparatus 1-2 are subordinately (concurrently) disconnected, it is possible to rapidly apply modulation scheme information of the disconnection-mode range to the modulator 102 of the current apparatus 1-1 (i.e. the modulator 102 which transmits signals from the current apparatus 1-1 to the opposite-side wireless communication apparatus 1-2).

Second Embodiment

Figure 7:
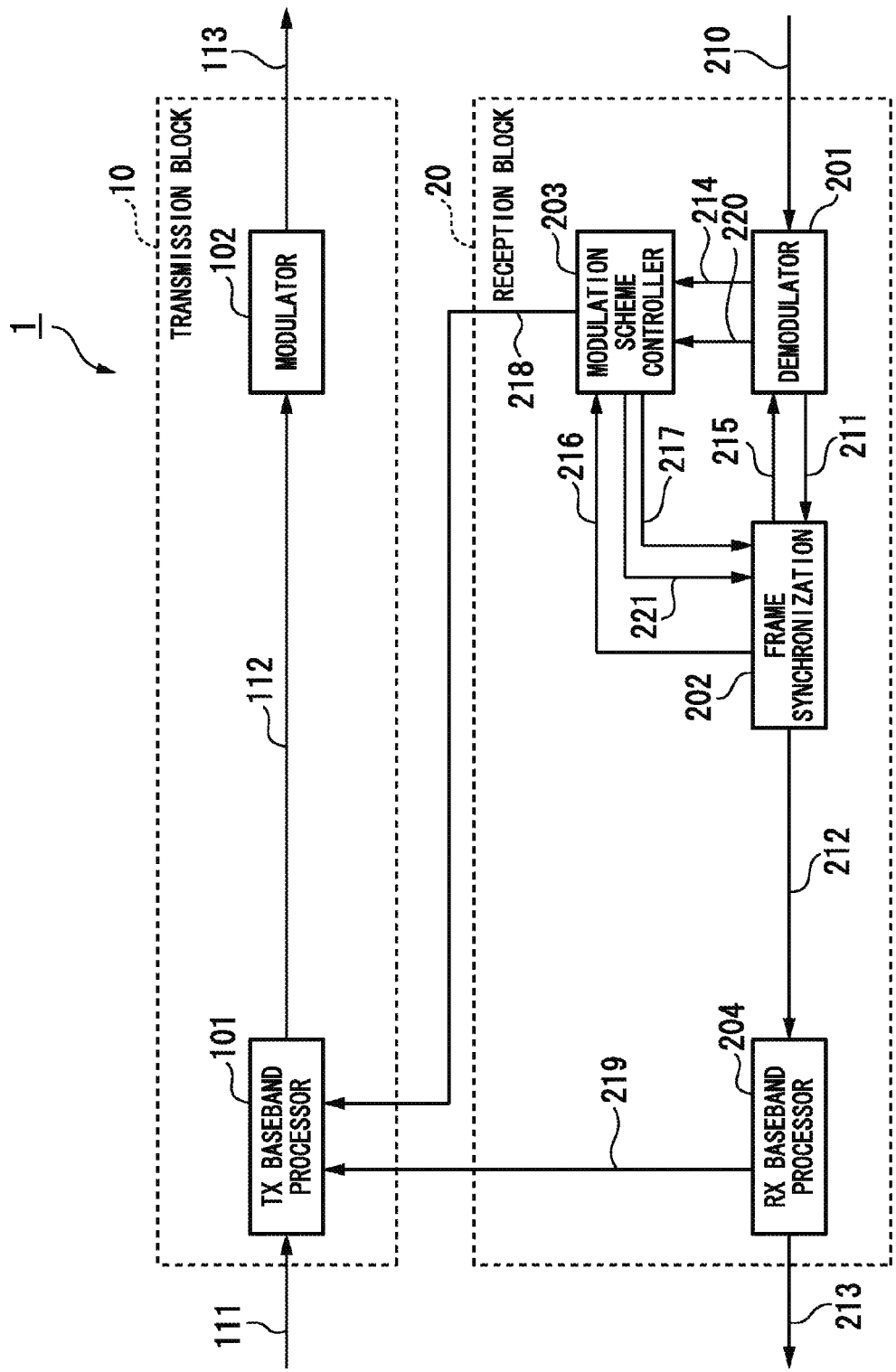
FIG. 7 A block diagram showing a functional configuration of a wireless communication apparatus according to a second embodiment of the present invention.

FIG. 7 is a block diagram showing the functional configuration of the wireless communication apparatus 1 according to a second embodiment. Hereinafter, the wireless communication apparatus 1 of the second embodiment will be described in terms of its difference compared to the wireless communication apparatus 1 of the first embodiment.

The demodulator 201 of the second embodiment corresponds to the receiver 21, the disconnection detector 22, and the wireless transmission path estimation part 24. The demodulator 201 of the second embodiment detects carrier asynchronism so as to generate a carrier asynchronism starting signal 220 representing the detection result. Upon detecting carrier asynchronism, for example, the demodulator 201 sets a value of "High" to the carrier asynchronism starting signal 220. Without detecting carrier asynchronism (i.e. in the case of carrier synchronism), it sets a value of "Low" to the carrier asynchronism starting signal 220. Subsequently, the demodulator 201 sends the carrier asynchronism starting signal 220 to the modulation scheme controller 203.

Based on the carrier asynchronism starting signal 220, the modulation scheme controller 203 of the second embodiment determines whether or not a wireless line connected to the opposite-side wireless communication apparatus 1-2 has been disconnected. In response to the carrier asynchronism starting signal 220 representing carrier asynchronism, the modulation scheme controller 203 determines that a wireless line has been disconnected. On the other hand, the modulation scheme controller 203 determines that a wireless line is connected normally in response to the carrier asynchronism starting signal 220 representing carrier synchronism.

The modulation scheme controller 203 of the second embodiment employs the same process, which selects a multi-value modulation number in response to the existence/nonexistence of disconnection of a wireless line, as the first embodiment, which is shown in FIG. 6. In the second embodiment, step S101 of FIG. 6 is directed to a process for receiving the carrier asynchronism starting signal 220.

Upon receiving the carrier asynchronism starting signal 220 representing carrier asynchronism, the modulation scheme controller 203 of the second embodiment sets modulation scheme information, specified by a wireless disconnection-mode modulation scheme information signal 217 (i.e. modulation scheme information corresponding to a multi-value modulation number which is selected in a disconnection mode of a wireless line), to an opposite forwarding-mode modulation scheme information signal 218. In this case, the modulation scheme controller 203 sets a value (e.g. "High"), representing disconnection of a wireless line, to a wireless disconnection-mode modulation scheme control signal 221, which is sent to the frame synchronization part 202.

Upon receiving the wireless disconnection-mode modulation scheme control signal 221 which is set to have a value representing disconnection of a wireless line, the frame synchronization part 202 of the second embodiment overwrites a demodulation-mode modulation scheme information signal 215 with modulation scheme information, specified by the wireless disconnection-mode modulation scheme information signal 217, so as to send it out. In this connection, the frame synchronization part 202 does not necessarily adopt the wireless disconnection-mode modulation scheme control signal 221 as a timing signal for applying the wireless disconnection-mode modulation scheme information signal 217 but may directly adopt the carrier asynchronism starting signal 220. That is, the frame synchronization part 202 can be reconfigured such that, upon receiving the carrier asynchronism starting signal 220 representing disconnection of a wireless line, it rewrites the demodulation-mode modulation scheme information signal 215 with modulation scheme information, specified by the wireless disconnection-mode modulation scheme information signal 217, so as to send it out.

According to the wireless communication apparatus 1 of the second embodiment having the foregoing configuration, disconnection of a wireless line is detected based on carrier asynchronism. Compared with the wireless communication apparatus 1 of the first embodiment that detects disconnection of a wireless line based on frame asynchronism, it is possible to rapidly detect disconnection of a wireless line. For this reason, it is possible to rapidly perform a process which selects a multi-value modulation number within the disconnection-mode range in response to disconnection of a wireless line so as to notify it to the opposite-side wireless communication apparatus 1-2; hence, it is possible to restore a normal condition of a wireless line in a short period of time.

Third Embodiment

Figure 8:
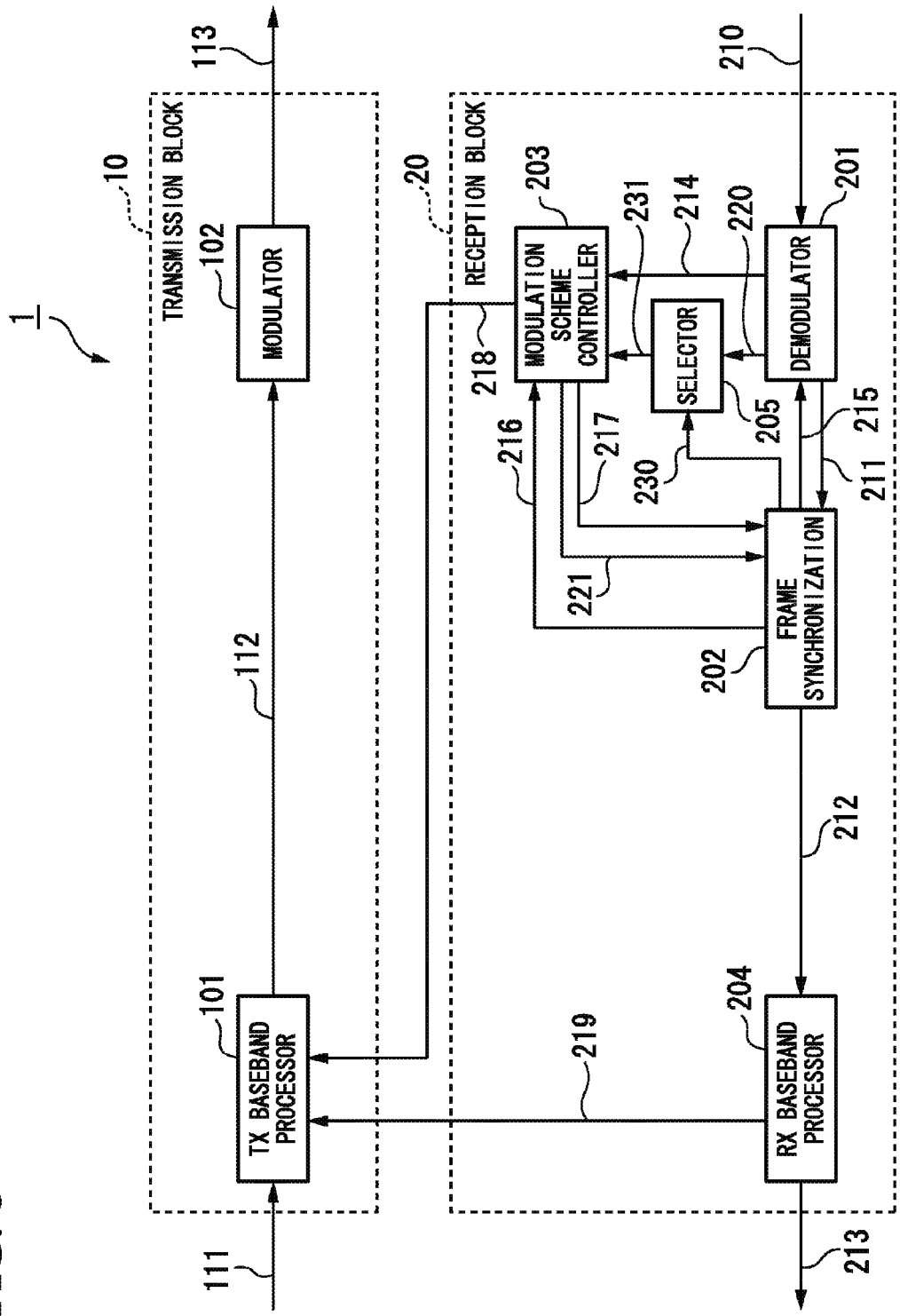
FIG. 8 A block diagram showing a functional configuration of a wireless communication apparatus according to a third embodiment of the present invention.

FIG. 8 is a diagrammatical block diagram showing the functional configuration of the wireless communication apparatus 1 according to a third embodiment. Hereinafter, the wireless communication apparatus 1 of the third embodiment will be described in terms of its difference compared to the wireless communication apparatuses 1 of the first and second embodiments.

In the wireless communication apparatus 1 of the third embodiment, the reception block 20 further includes a selector 205. In the third embodiment, the demodulator 201, the frame synchronization part 202, and the selector 205 correspond to the disconnection detector 22.

The demodulator 201 of the third embodiment detects carrier asynchronism so as to generate a carrier asynchronism starting signal 220 representing the detection result. Upon detecting carrier asynchronism, for example, the demodulator 201 sets a value of "High" to the carrier asynchronism starting signal 220. Without carrier asynchronism (i.e. in the case of carrier synchronism), it sets a value of "Low" to the carrier asynchronism starting signal 220. Subsequently, the demodulator 201 sends the generated carrier asynchronism starting signal 220 to the selector 205.

The frame synchronization part 202 of the third embodiment detects frame asynchronism so as to generate a frame asynchronism starting signal 230 representing the detection result. Subsequently, the frame synchronization part 202 sends the generated frame asynchronism starting signal 230 to the selector 205.

In response to the frame asynchronism starting signal 230 and the carrier asynchronism starting signal 220, the selector 205 makes a decision on disconnection of a wireless line according to a preset decision criterion. For example, the preset decision criterion of the selector 205 is set in a programmable manner using parameters. Specifically, it is set to select any one of a criterion emphasizing decision speed, a criterion emphasizing decision accuracy, and a criterion emphasizing both the decision speed and the decision accuracy. In the case of a criterion which is set to emphasize the decision speed, the selector 205 determines the existence/nonexistence of disconnection of a wireless line based on a value of the carrier asychronism starting signal 220 irrespective of a value of the frame asynchronism starting signal 230. In the case of a criterion which is set to emphasize the decision accuracy, the selector 205 determines the existence/non-existence of disconnection of a wireless line based on a value of the frame asynchronism starting signal 230 irrespective of a value of the carrier asynchronism starting signal 220. In the case of a criterion which is set to emphasize both the decision speed and the decision accuracy, the selector 205 determines disconnection of a wireless line when the carrier asynchronism starting signal 220 indicates carrier asynchronism or when the frame asynchronism starting signal 230 indicates frame asynchronism. Subsequently, the selector 205 generates an asynchronism starting signal 231 representing existence/nonexistence of disconnection of a wireless line so as to send it to the modulation scheme controller 203.

Based on the asynchronism starting signal 231, the modulation scheme controller 203 of the third embodiment determines whether or not a wireless line connected to the opposite-side wireless communication apparatus 1-2 has been disconnected. Upon receiving the asynchronism starting signal 231 representing disconnection of a wireless line, the modulation scheme controller 203 sets modulation scheme information, specified by a wireless disconnection-mode modulation scheme information signal 217 (i.e. modulation scheme information which is selected in response to a multi-value modulation number in a disconnection mode of a wireless line), to an opposite forwarding-mode modulation scheme information signal 218. In this case, the modulation scheme controller 203 sets a value (e.g. "High"), representing disconnection of a wireless line, to a wireless disconnection-mode modulation scheme control signal 221 so as to send it to the frame synchronization part 202.

Upon receiving the wireless disconnection-mode modulation scheme control signal 221 which is set to have a value representing disconnection of a wireless line, the frame synchronization part 202 of the third embodiment overwrites a demodulation-mode modulation scheme information signal 215 with the modulation scheme information specified by the wireless disconnection-mode modulation scheme information signal 217. In this connection, the frame synchronization part 202 does not necessarily adopts the wireless disconnection-mode modulation scheme control signal 221 as a timing signal for applying the wireless disconnection-mode modulation scheme information signal 217 but may directly adopt the asynchronism starting signal 231. That is, the frame synchronization part 202 can be reconfigured such that, upon receiving the asynchronism starting signal 231 representing disconnection of a wireless line, it overwrites the demodulation-mode modulation scheme information signal 215 with the modulation scheme information specified by the wireless disconnection-mode modulation scheme information signal 217.

According to the wireless communication apparatus 1 of the third embodiment having the foregoing configuration, it is possible to change a decision criterion to emphasize speed and accuracy in detecting disconnection of a wireless line by changing the setting of the selector 205 in light of the applied environment of the wireless communication apparatus 1.

Heretofore, the embodiments of this invention are described in detail with reference to the drawings, but concrete configurations thereof are not necessarily limited to the embodiments; hence, this invention may embrace any type of design without departing from the scope of the invention.

The present application claims priority based on Japanese Patent Application No. 2009-269961 filed Nov. 27, 2009, the entire content of which will be incorporated herein by reference.

INDUSTRIAL APPLICABILITY

The present invention is applicable to a fixed microwave radio transmission apparatus employing an adaptive modulation method and a radio base station of mobile communication, wherein it is possible to restore wireless lines in a short time after disconnection of wireless lines.

REFERENCE SIGNS LIST 1 wireless communication apparatus
1-1 current apparatus
1-2 opposite-side wireless communication apparatus
10 transmission block
101 TX baseband processor
102 modulator
20 reception block
201 demodulator
202 frame synchronization part
203 modulation scheme controller
204 RX baseband processor
205 selector

The invention claimed is:

1. A wireless communication apparatus comprising:
a receiver configured to receive a wireless signal from a counterpart wireless communication apparatus via a wireless line;
a disconnection detector configured to detect disconnection of the wireless line connected to said counterpart wireless communication apparatus due to degradation of a communicating condition;
a modulation scheme controller configured to select a modulation scheme, enabling communication under poor conditions in the wireless line, rather than a previous modulation scheme which has been used in wireless communication when the disconnection of the wireless line is detected; and
a transmitter configured to notify the modulation scheme selected by the modulation scheme controller to said counterpart wireless communication apparatus, thus applying the selected modulation scheme in generating its transmitting signal,
wherein the disconnection detector is configured to determine that the wireless line is disconnected when at least one of the following occurs:
(i) a wireless frame is not synchronized with the wireless signal received by the receiver,
(ii) a carrier is not synchronized with the wireless signal received by the receiver, or
(iii) a decision as to whether or not a wireless frame is synchronized with the wireless signal received by the receiver and a decision as to whether or not a carrier is synchronized with the received wireless signal.

2. The wireless communication apparatus according to claim 1, further comprising:
a wireless line estimation part configured to estimate a condition of the wireless line based on the wireless signal received by the receiver,
wherein the modulation scheme controller is configured to adaptively select its modulation scheme based on an estimation result of the wireless line estimation part when the disconnection detector fails to detect disconnection of the wireless line.

3. The wireless communication apparatus according to claim 2, wherein the modulation scheme controller is configured to adaptively select its modulation scheme among first modulation schemes based on the estimation result of the wireless line estimation part when the disconnection detector fails to detect disconnection of the wireless line, while the modulation scheme controller selects its modulation scheme among second modulation schemes enabling communication irrespective of degradation of a communicating condition when the disconnection of the wireless line is detected.

4. The wireless communication apparatus according to claim 1, wherein the disconnection detector is configured to determine that the wireless line is disconnected when a wireless frame is not synchronized with the wireless signal received by the receiver.

5. The wireless communication apparatus according to claim 1, wherein the disconnection detector is configured to determine that the wireless line is disconnected when a carrier is not synchronized with the wireless signal received by the receiver.

6. The wireless communication apparatus according to claim 1, wherein the disconnection detector is configured to detect disconnection of the wireless line based on a decision as to whether or not a wireless frame is synchronized with the wireless signal received by the receiver and a decision as to whether or not a carrier is synchronized with the received wireless signal.

7. A wireless communication system including the wireless communication apparatus and the counterpart wireless communication apparatus according to claim 1, wherein said counterpart wireless communication apparatus includes a receiver configured to receive notification indicating the selected modulation scheme from said wireless communication apparatus and a transmitter configured to transmit signals to said wireless communication apparatus based on the selected modulation scheme received by the receiver.

8. A wireless communication apparatus comprising:
a receiver configured to receive a wireless signal from a counterpart wireless communication apparatus via a wireless line;
a disconnection detector configured to detect disconnection of the wireless line connected to said counterpart wireless communication apparatus due to degradation of a communicating condition;

a modulation scheme controller configured to select a modulation scheme, enabling communication under poor conditions in the wireless line, rather than a previous modulation scheme which has been used in wireless communication when the disconnection of the wireless line is detected; and a transmitter configured to notify the modulation scheme selected by the modulation scheme controller to said counterpart wireless communication apparatus, thus applying the selected modulation scheme in generating its transmitting signal, wherein the modulation scheme controller is configured to select its modulation scheme using a lowest multi-value modulation number among selectable modulation schemes when the disconnection of the wireless line is detected.

9. A wireless communication method comprising:

receiving a wireless signal from a counterpart wireless communication apparatus via a wireless line;

detecting disconnection of the wireless line connected to said counterpart wireless communication apparatus due to degradation of a communicating condition;

selecting a modulation scheme, enabling communication under poor conditions in the wireless line, rather than a previous modulation scheme which has been used in wireless communication when the disconnection of the wireless line is detected; and notifying the selected modulation scheme to said counterpart wireless communication apparatus, thus applying the selected modulation scheme in generating its transmitting signal, wherein it is determined that the wireless line is disconnected when at least one of the following occurs:

(i) a wireless frame is not synchronized with the received wireless signal, (ii) a carrier is not synchronized with the received wireless signal, or (iii) a decision as to whether or not a wireless frame is synchronized with the received wireless signal and a decision as to whether or not a carrier is synchronized with the received wireless signal.

10. The wireless communication method according to claim 9, further comprising:

estimating a condition of the wireless line based on the received wireless signal; and adaptively selecting the modulation scheme based on an estimation result regarding the condition of the wireless line.

11. The wireless communication method according to claim 10, wherein a modulation scheme is adaptively selected from among first modulation schemes based on the estimation result regarding the condition of the wireless line when the disconnection of the wireless line is not detected, while a modulation scheme is selected from among second modulation schemes enabling communication irrespective of degradation of a communicating condition when the disconnection of the wireless line is detected.

12. The wireless communication method according to claim 9, wherein it is determined that the wireless line is disconnected when a wireless frame is not synchronized with the received wireless signal.

13. The wireless communication method according to claim 9, wherein it is determined that the wireless line is disconnected when a carrier is not synchronized with the received wireless signal.

14. The wireless communication method according to claim 9, wherein the disconnection of the wireless line is detected based on a decision as to whether or not a wireless frame is synchronized with the received wireless signal and a decision as to whether or not a carrier is synchronized with the received wireless signal.

15. A wireless communication method comprising:

receiving a wireless signal from a counterpart wireless communication apparatus via a wireless line;

detecting disconnection of the wireless line connected to said counterpart wireless communication apparatus due to degradation of a communicating condition;

selecting a modulation scheme enabling communication under poor conditions in the wireless line, rather than a previous modulation scheme which has been used in wireless communication when the disconnection of the wireless line is detected; and notifying the selected modulation scheme to said counterpart wireless communication apparatus, thus applying the selected modulation scheme in generating its transmitting signal, wherein a modulation scheme using a lowest multi-value modulation number is selected from among selectable modulation schemes when the disconnection of the wireless line is detected.

16. A wireless communication method for a first wireless communication apparatus and a second wireless communication apparatus which perform wireless communication via a wireless line, said wireless communication method comprising steps in which:

said first wireless communication apparatus receives a wireless signal from said second wireless communication apparatus via the wireless line;

said first wireless communication apparatus detects disconnection of the wireless line connected to said second wireless communication apparatus due to degradation of a communicating condition;

said first wireless communication apparatus selects a modulation scheme, enabling communication under poor conditions in the wireless line, rather than a previous modulation scheme which has been selected in wireless communication when the disconnection of the wireless line is detected;

said first wireless communication apparatus notifies the selected modulation scheme to said second wireless communication apparatus;

said second wireless communication apparatus receives notification indicating the selected modulation scheme from the first wireless communication apparatus; and said second wireless communication apparatus transmits signals to said first wireless communication apparatus based on the selected modulation scheme, wherein said first wireless communication apparatus selects a modulation scheme using a lowest multi-value modulation number from among selectable modulation schemes when the disconnection of the wireless line is detected.

* * * * *